United States Patent
Murray et al.

(10) Patent No.: US 8,029,174 B2
(45) Date of Patent: Oct. 4, 2011

(54) THRESHOLD LIGHTING SYSTEM

(75) Inventors: Andrew M. Murray, Granger, IN (US); Duane L. Yoder, Nappanee, IN (US)

(73) Assignee: Lippert Components Inc., Goshen, IN (US)

( * ) Notice: Subject to any disclaimer, the term of this patent is extended or adjusted under 35 U.S.C. 154(b) by 142 days.

(21) Appl. No.: 12/433,317

(22) Filed: Apr. 30, 2009

(65) Prior Publication Data

US 2010/0277898 A1  Nov. 4, 2010

(51) Int. Cl.
*B60Q 1/32* (2006.01)
*F21S 8/00* (2006.01)

(52) U.S. Cl. ............... 362/481; 362/146; 362/540

(58) Field of Classification Search .......... 362/481, 362/495, 501, 540, 145, 146, 153; 280/164.1
See application file for complete search history.

(56) References Cited

U.S. PATENT DOCUMENTS

| | | | | |
|---|---|---|---|---|
| 4,463,962 A | * | 8/1984 | Snyder | 280/164.1 |
| 6,416,200 B1 | * | 7/2002 | George | 362/146 |
| 6,606,827 B1 | * | 8/2003 | Hoffmann | 52/28 |
| 6,783,267 B1 | * | 8/2004 | Yeoman et al. | 362/485 |
| 7,339,488 B2 | * | 3/2008 | Pennington et al. | 340/691.1 |
| 2002/0172054 A1 | * | 11/2002 | Teng | 362/495 |
| 2008/0013303 A1 | * | 1/2008 | Guarino | 362/145 |

* cited by examiner

*Primary Examiner* — Jong-Suk (James) Lee
*Assistant Examiner* — Peggy A. Neils
(74) *Attorney, Agent, or Firm* — Barnes & Thornburg LLP

(57) ABSTRACT

A threshold lighting system for recreation vehicles and the like. The system includes a threshold with a first light cavity extending along one side of the threshold for emitting light inwardly into a recreational vehicle in a first direction generally parallel to the vehicle floor, and a second light cavity on the opposite side of the threshold for emitting light in a second direction down the stairs leading to the threshold. The light cavities are preferably part of an extrusion forming the threshold, and the threshold is typically part of a door frame assembly provided as a unit.

15 Claims, 2 Drawing Sheets

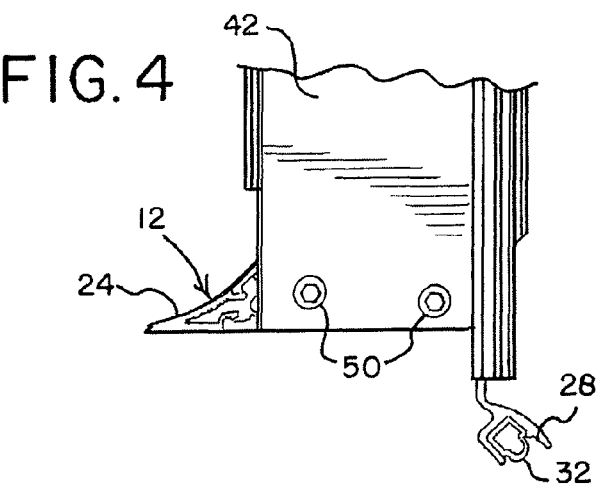
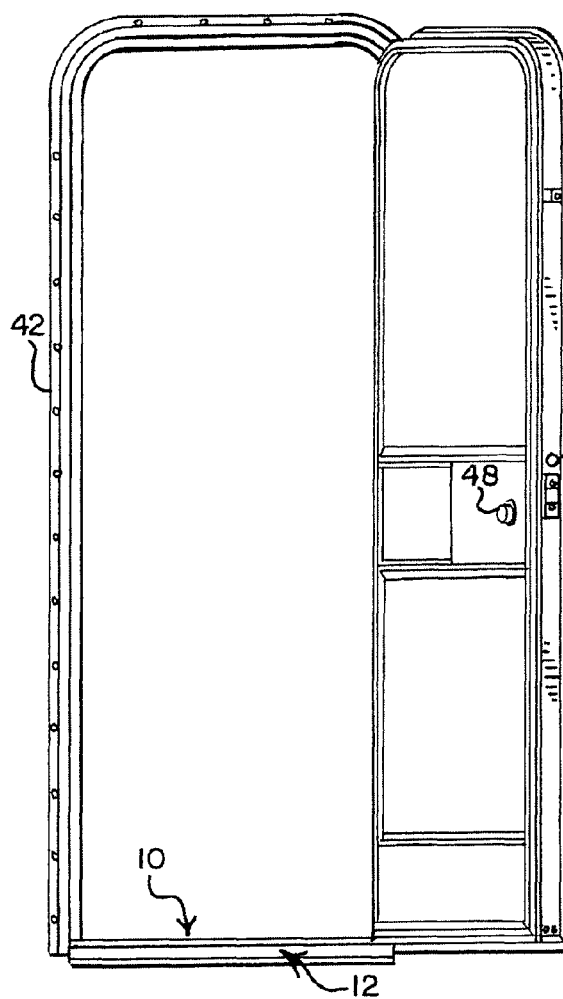
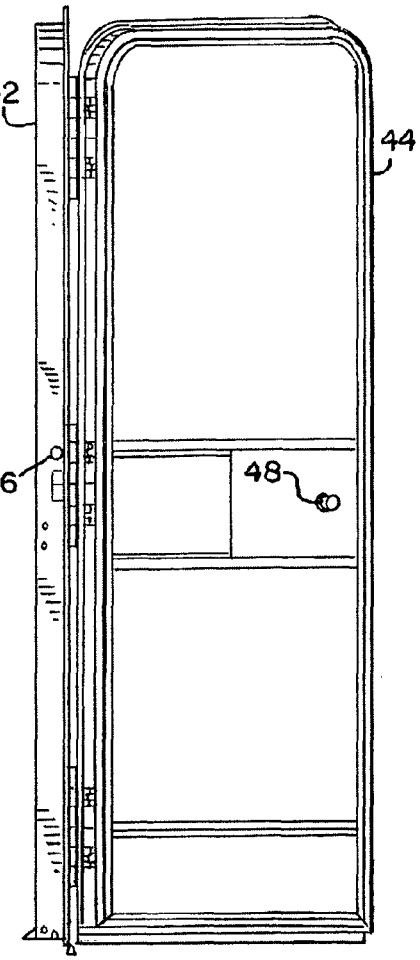

THRESHOLD LIGHTING SYSTEM

BACKGROUND OF THE INVENTION

This invention relates to lighting systems, and in particular to a threshold lighting system for lighting both the adjacent floor area and stairs leading to an entry door.

As an example, safety when entering a recreational vehicle is always is of a concern, particularly at night when lighting may be limited. Therefore, various types of lighting for recreational vehicles has been developed, typically an exterior light that will illuminate from above the stairs leading to the door providing entry to the recreational vehicle.

Various types of lighting for steps and stairs has also been developed. U.S. Pat. Nos. 5,222,799; 6,416,200; 6,606,827 and RE 37,133 are examples of various types of step and stair lighting. Published US Application No. US 2007/0290475 is directed to step lights for entry steps for a recreational vehicle, the steps being deployed once the recreational vehicle is in place.

SUMMARY OF THE INVENTION

The invention is directed to a threshold lighting system comprising a threshold for mounting in a doorframe, the threshold having an elongated tread surface on a main body of the threshold. An elongated first light cavity extends along the first side of the threshold, with the first light cavity having a first light support and a first light outlet such that light created in the first light cavity is emitted from the threshold in a first direction generally parallel to a surface upon which the threshold is mounted. An elongated second light cavity is provided, extending along a second side of the threshold opposite the first side, with the second light cavity having a second light surface and a second light outlet such that light created in the second light cavity is emitted from the threshold in a second direction which is generally oblique to the surface upon which the threshold is mounted.

In accordance with the preferred form of the invention, the second light cavity is located at an elevation lower than the first light cavity when the threshold is in place. To this end, a downwardly depending web connects the second light cavity to the main body of the threshold.

Preferably the first light cavity is an integral portion of the main body. An elongated lens is provided at the first light outlet for directing light emitted from the first light outlet.

The threshold preferably is mounted in a door frame assembly which includes a door with a switch located in the door frame assembly and electrically connected to the first and second light cavities. In accordance with one form of the invention, the switch is a magnetic switch which is activated by movement of the door.

For lighting purposes, a first light strip is mounted in the first light support of the first light cavity, and a second light strip is mounted in the second light support of the second light cavity. Each light strip may comprise a string of light emitting diodes, although other light sources can be used, as well.

BRIEF DESCRIPTION OF THE DRAWINGS

The invention is described in greater detail in the following description of examples embodying the best mode of the invention, taken in conjunction with the drawing figures, in which:

FIG. 4 is an enlarged view of the bottom portion of the door frame assembly shown in FIG. 3, FIG. 5 is a view similar to FIG. 2, but with the door of the door frame assembly opened, and FIG. 6 is a view similar to FIG. 3, but with the door of the door frame assembly opened.

DESCRIPTION OF EXAMPLES EMBODYING THE BEST MODE OF THE INVENTION

Figure 1:
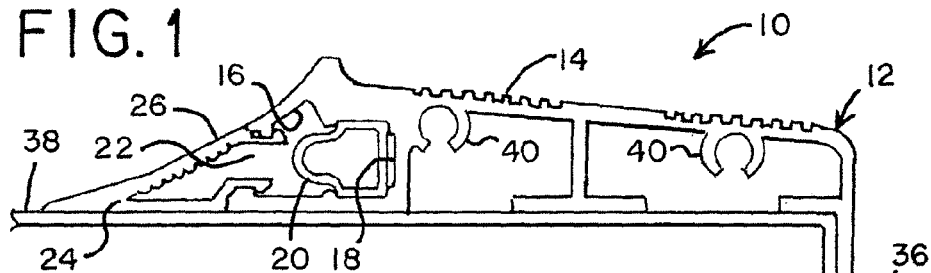
FIG. 1 is an enlarged cross-sectional illustration of a threshold employing the threshold lighting system according to the invention.

A threshold lighting system according to the invention is depicted generally at 10 in the drawing figures. The threshold lighting system 10 is composed of a threshold 12 for mounting in a door frame (described below in relation to FIGS. 2 through 6). The threshold 12 typically has an elongated tread surface 14 on the main body of the threshold, as illustrated in FIG. 1.

The threshold 12 preferably is an elongated extrusion made of metal such as aluminum or other suitable material, such as a composite, and, as with any typical threshold, has an appropriate pattern on the tread surface 14 to help prevent a person from slipping when stepping on the tread surface 14. The particular pattern of the tread surface 14 forms no part of the invention.

An elongated first light cavity 16 extends along one side of the threshold 12 and includes a support 18 for a light 20 installed in the first light cavity 16. The light 20, which can be a light strip in the form of a string of light emitting diodes or the like, is oriented in the light cavity 16 by the light support 18 to shine light through a light outlet 22 formed at one side of the light cavity 16. A lens 24 extends from the outlet 22 and is appropriately fitted to the threshold 12, such as by snapping into the opening comprising the light outlet 22 as shown. The lens 24 preferably is transparent or translucent to permit ready passage of light therethrough.

The lens 24 may be provided in any particular desired shape, although preferably the lens 24, in combination with the adjacent structure of the threshold 12, forms a generally continuous inclined surface 26 which may facilitate sweeping of debris from inside a recreational vehicle over the top or tread surface 14 of the threshold 12 and out of the vehicle.

An elongated second light cavity 28 extends along the opposite side of the threshold 12 as shown. The second light cavity 28 includes a light support 30 in which a light 32 is installed. Similar to the light 20, the light 32 may comprise a light strip in the form of a string of light emitting diodes or a similar lighting source. The light 32 is installed in the light support 30 so as to emit light through a light outlet 34 in a direction generally oblique to and in the opposite direction to light emitted from the first light outlet 22. As explained in greater detail below, the oblique angle of light from the light outlet 34 is intended to be at an angle such that stairs leading to the recreational vehicle in which the threshold 12 is mounted are illuminated.

As illustrated, the second light cavity 28 is at an elevation lower than the first light cavity 16. The threshold 12 includes a downwardly depending web 36 which connects the second light cavity 28 to the main body of the threshold 12.

The threshold 12 is formed to be mounted on an appropriate surface 38, such as the outer area of the floor of a recreational vehicle. The means of mounting and location of mounting of the threshold 12 form no part of the invention.

Preferably the extrusion of the threshold 12 includes appropriate means for securing the threshold 12 to a door frame. Thus, as illustrated, the threshold 12 includes one or more socket 40 in which screws can be installed.

The threshold lighting system 10 is preferably installed in a door frame assembly comprising a door frame 42 in which a suitable door 44 is mounted on hinges 46. The door 42 includes a latch 48 appropriately secured to the door frame 42 when the door 44 is closed.

The threshold 12 is mounted between opposite sides of the door frame 42 as illustrated. For securing the threshold 12 in place, bolts or screws 50 are passed through the threshold 12 into the sockets 40 (FIG. 1).

An appropriate electrical source 52, such as a battery, generator or other appropriate means carried by a recreational vehicle (not illustrated) provides power for illuminating the lights 20 and 32. Wiring 54 leads from the source 52 to both the lights 20 and 32, and also a switch 56 used to illuminate the lights 20 and 32. The switch 56 is closed when the door 44 is opened. While the switch 56 can be a mechanical switch, preferably the switch 56 is a magnetic switch which is closed when the door 44 is opened. To that end, the door 44 carries a magnet 58 located in registration with the switch 56 so that when the door 44 is closed, the magnet 58 opens the switch 56 and, vice versa, when the door 44 is opened, the magnet 58 is no longer in the proximity of the switch 56, and the switch closes, connecting the electrical source 52 to the lights 20 and 32.

Figure 2:
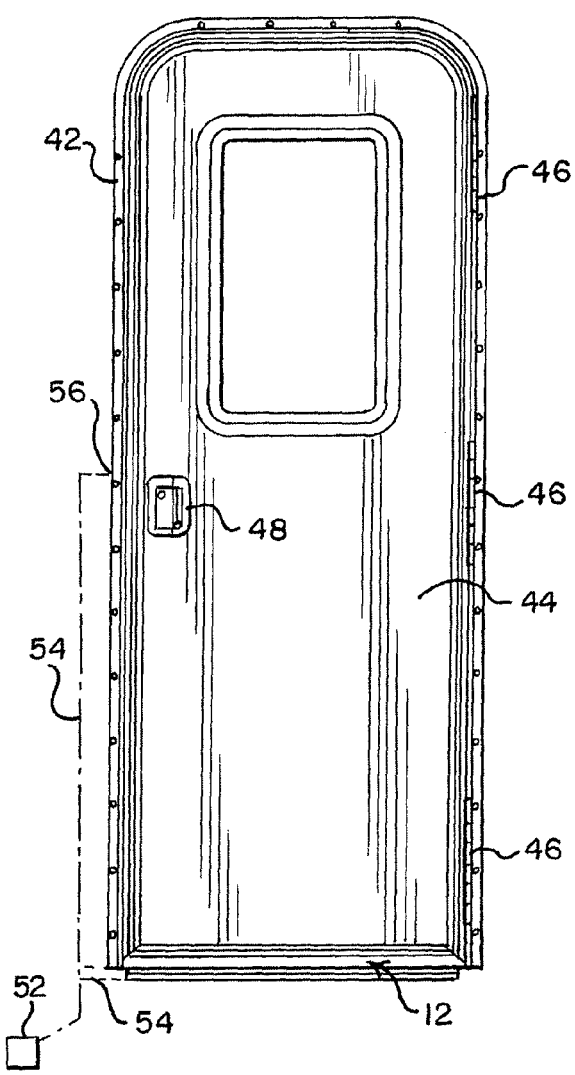
FIG. 2 is an elevational illustration of a door frame assembly employing the threshold lighting system of the invention.
Figure 3:
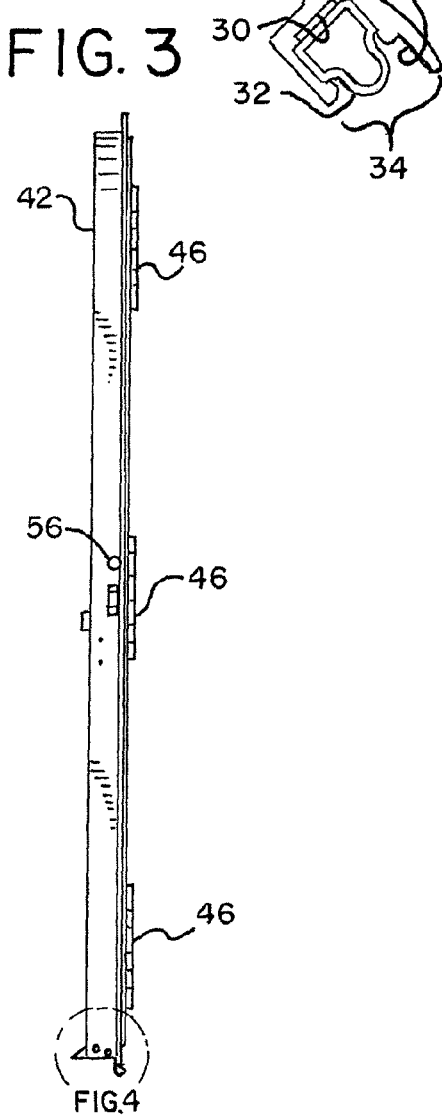
FIG. 3 is a side elevational illustration of the door frame assembly of FIG. 2.

Although not illustrated, the typical recreational vehicle in which the threshold lighting system and door frame assembly of the invention are located includes stairs which lead down from the recreational vehicle, thus toward the reader viewing FIGS. 2 and 5 and to the right in relation to FIGS. 3, 4 and 6. The orientation of the second light cavity 28 is such that its oblique angle of illumination bathes the stairs in light when the light 32 is illuminated. The oblique angle at which the light is emitted from the light outlet 34 can be varied, depending on the nature of the stairs leading from the recreational vehicle. At all times, however, light is emitted from the second light outlet 34 at an angle that is oblique to light omitted from the light outlet 22. Light from the light outlet 22 extends generally along and parallel to the surface 38, which is the inner floor area of the recreational vehicle in which the invention is located. Thus, the invention illuminates not only the stairs providing entry into a recreational vehicle, but also the inner floor area extending into the interior of the recreational vehicle from the threshold 12. Thus, the invention is a significant improvement, lighting the entry area both outside and inside the recreational vehicle in which the threshold lighting system 10 is located.

Various changes can be made to the invention without departing from the spirit thereof or scope of the following claims.

What is claimed:

1. A threshold lighting system, comprising
   a. a threshold for mounting in a door frame, said threshold having a length and having an elongated tread surface on a main body of said threshold,
   b. an elongated first light cavity extending along a first side of said threshold for substantially said length, said first light cavity having a first light support and a first light outlet such that light created in said first light cavity is emitted from said threshold in a first direction generally parallel to a surface upon which said threshold is mounted, and
   c. an elongated second light cavity extending along a second side of said threshold opposite said first side, said second light cavity having a second light support and a second light outlet such that light created in said second light cavity is emitted from said threshold in a second direction generally oblique to said surface upon which said threshold is mounted.

2. The threshold lighting system according to claim 1, in which said second light cavity is at an elevation lower than said first light cavity.

3. The threshold lighting system according to claim 2, including a downwardly depending web connecting said second light cavity to said main body.

4. The threshold lighting system according to claim 1, in which said first light cavity is an integral portion of said main body, and including an elongated lens at said first light outlet for directing light emission.

5. The threshold lighting system according to claim 1, included in a door frame assembly including a door, and including a switch located in said door frame assembly electrically connected to said first and second light cavities.

6. The threshold lighting system according to claim 5, in which said switch is a magnetic switch activated by said door.

7. The threshold lighting system according to claim 1, including a first strip light mounted in said first light support and a second strip light mounted in said second light support.

8. The threshold lighting system according to claim 7, in which each strip light comprises a string of light-emitting diodes.

9. A threshold lighting system, comprising
   a. a threshold for mounting in a door frame, said threshold having an elongated tread surface on a main body of said threshold,
   b. an elongated first light cavity extending along a first side of said threshold, said first light cavity having a first light support and a first light outlet such that light created in said first light cavity is emitted from said threshold in a first direction generally parallel to a surface upon which said threshold is mounted, and
   c. said first light cavity being an integral portion of said main body, and including an elongated lens at said first light outlet for directing light emission, said elongated lens being shaped to form an inclined surface extending from said surface to an upper surface of said threshold.

10. A door frame assembly with threshold lighting system, comprising
    a. a door frame including a door,
    b. a threshold mounted in said door frame, said threshold having a length and having an elongated tread surface on a main body of said threshold,
    c. an elongated first light cavity extending along a first side of said threshold for substantially said length, said first light cavity having a first light support and a first light outlet such that light created in said first light cavity is emitted from said threshold in a first direction generally parallel to a surface upon which said threshold is mounted, and
    d. an elongated second light cavity extending along a second side of said threshold opposite said first side, said second light cavity having a second light support and a second light outlet such that light created in said second light cavity is emitted from said threshold in a second direction generally oblique to said surface upon which said threshold is mounted.

11. The door frame assembly with threshold lighting system according to claim 10, in which said second light cavity is at an elevation lower than said first light cavity.

12. The door frame assembly with threshold lighting system according to claim 11, including a downwardly depending web connecting said second light cavity to said main body.

13. The door frame assembly with threshold lighting system according to claim 10, in which said first lighting cavity is an integral portion of said main body, and including an elongated lens at said first light outlet for directing light emission.

14. The door frame assembly with threshold lighting system according to claim 10, including a first strip light mounted in said first light support and a second strip light mounted in said second light support.

15. The door frame assembly with threshold lighting system according to claim 14, in which each strip light comprises a string of light-emitting diodes.

* * * * *